June 23, 1936. L. R. N. CARVALHO 2,045,121
APPARATUS FOR THE MANUFACTURE OF METAL CLOSURES
Filed Sept. 19, 1933 3 Sheets-Sheet 2

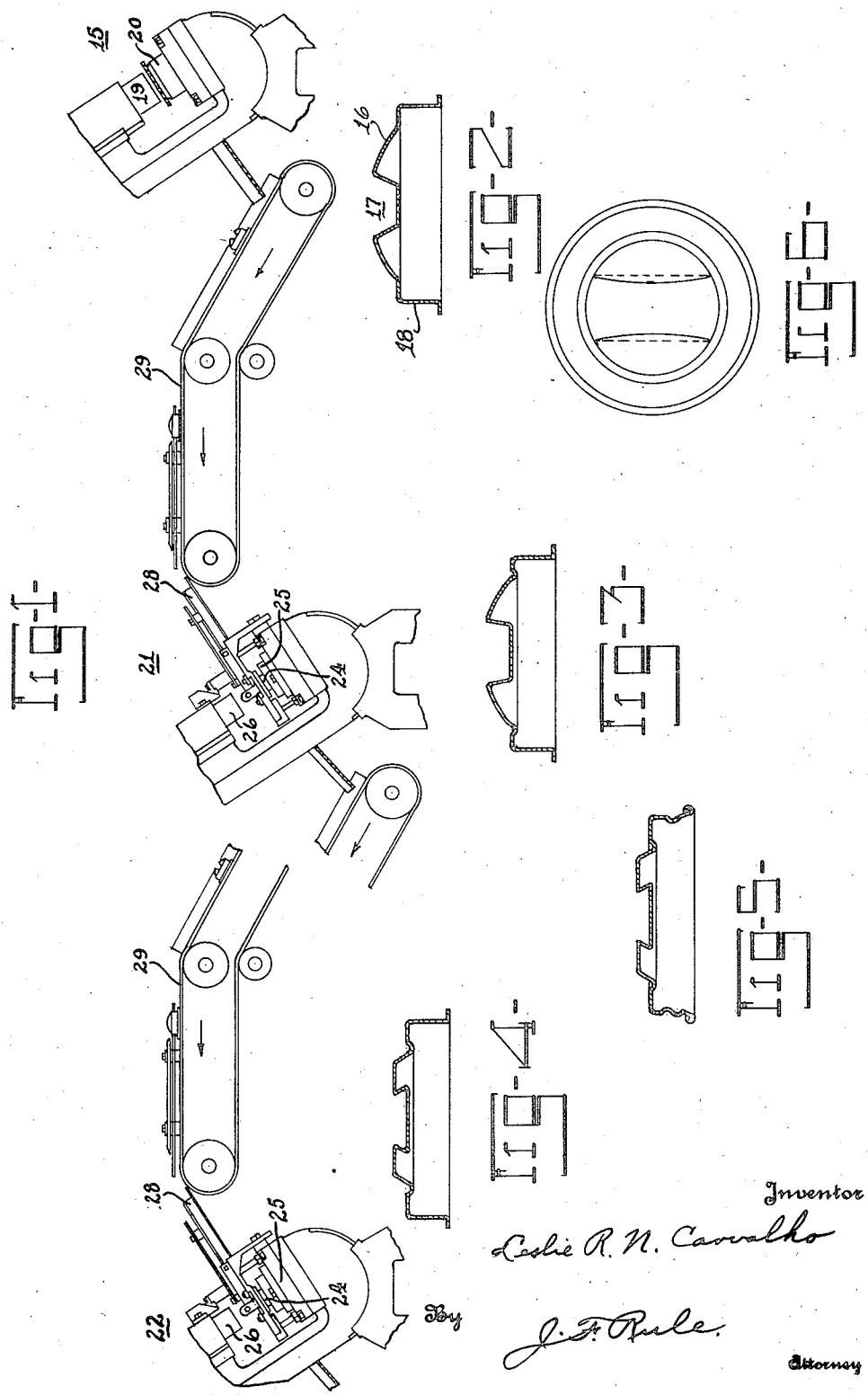

Inventor
Leslie R. N. Carvalho
By J. F. Rule
Attorney

June 23, 1936. L. R. N. CARVALHO 2,045,121
APPARATUS FOR THE MANUFACTURE OF METAL CLOSURES
Filed Sept. 19, 1933 3 Sheets—Sheet 3
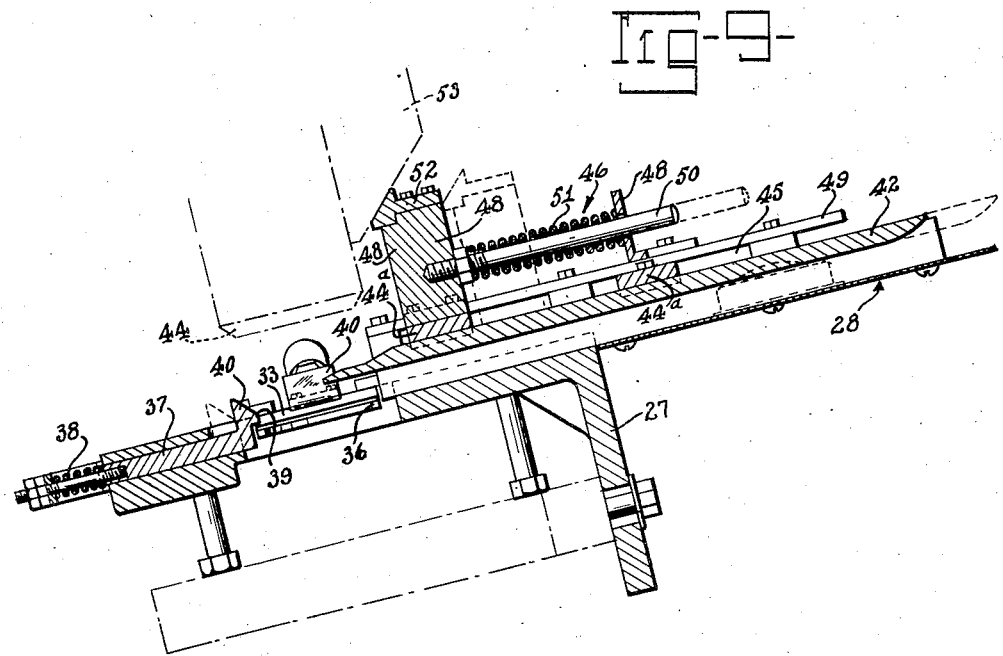
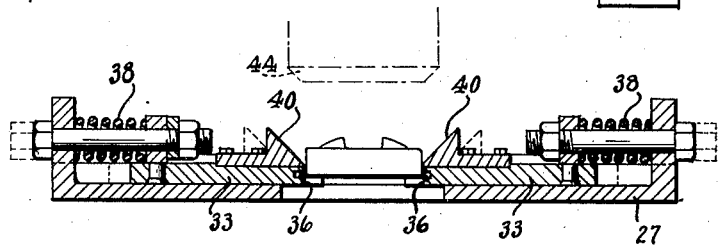
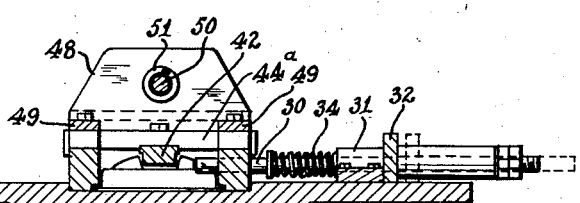
Inventor
Leslie R. N. Carvalho
By
J. F. Rule.
Attorney Patented June 23, 1936

2,045,121

UNITED STATES PATENT OFFICE 2,045,121

APPARATUS FOR THE MANUFACTURE OF METAL CLOSURES

Leslie R. N. Carvalho, Toledo, Ohio, assignor to The Closure Service Company, Toledo, Ohio, a corporation of Ohio Application September 19, 1933, Serial No. 690,093

5 Claims. (Cl. 113—113)

The present invention relates to improvements in apparatus for the manufacture of metal closures for bottles, jars or other containers and more particularly is concerned with means for transferring partially formed closures or blanks from one die to another and placing them in and removing them from the dies.

In a certain form of screw type metal closure the top portion or button is provided with an upwardly facing transverse channel or groove designed to accommodate an implement for rotating the closure and thereby facilitating its application to and removal from the container. In the production of this type of closure several operations are necessary, so that there is involved a gradual drawing of the metal to form the channel. The dies, of which there are several, include pairs of cooperating members which, upon being brought together, deform the top portion of the closure in a fashion to create the channel designed to receive the closure rotating implement. In the present disclosure the channel is created by a series of three dies. The members constituting each of the series of dies are identically positioned, and as a result the blanks or partially formed closures must be fed into all of the dies in precisely the same manner.

An object of the present invention is the provision of semi-automatic means through which proper feeding of the partially formed closures or blanks and accurate placing of them in the dies may be obtained. To this end conveyors are arranged between the dies and with each conveyor is associated a guide bar intended for projection into the channel which is formed in the blank by the first die of the series. The guide bar is arranged in alignment with the male and female members of the corresponding dies.

Another object is the provision of automatic means for regulating the delivery of blanks to the dies as well as holding the blanks during operation of the dies and discharging the blanks or partially formed closures from the dies.

Other objects will be in part apparent and in part pointed out hereinafter.

In the drawings:

Fig. 1 is a fragmentary side elevational view showing in more or less diagrammatic form a series of dies and blank conveying and guiding means between them.

Figs. 2, 3, 4, 5, and 6, are views showing the successive shapes assumed by the metal blank during the fabrication into a metal closure. Fig. 2 shows the first form of the blank as created by the combined cutting and forming die. Fig. 3 shows the next shape of the top portion as effected by the second forming die. Fig. 4 shows the blank after the third operation. Fig. 5 is a sectional view showing the complete closure. Fig. 6 is a top plan view thereof.

Fig. 9 is a sectional elevational view taken substantially along the line IX—IX of Fig. 7.

Fig. 10 is a sectional view taken substantially along the line X—X of Fig. 7.

Fig. 11 is a sectional view taken substantially along the line XI—XI of Fig. 7.

Fig. 12 is a fragmentary detail view showing the two members of the cutting and forming die.

Fig. 13 is a fragmentary detail view showing the two members of one of the forming dies.

Figure 7:
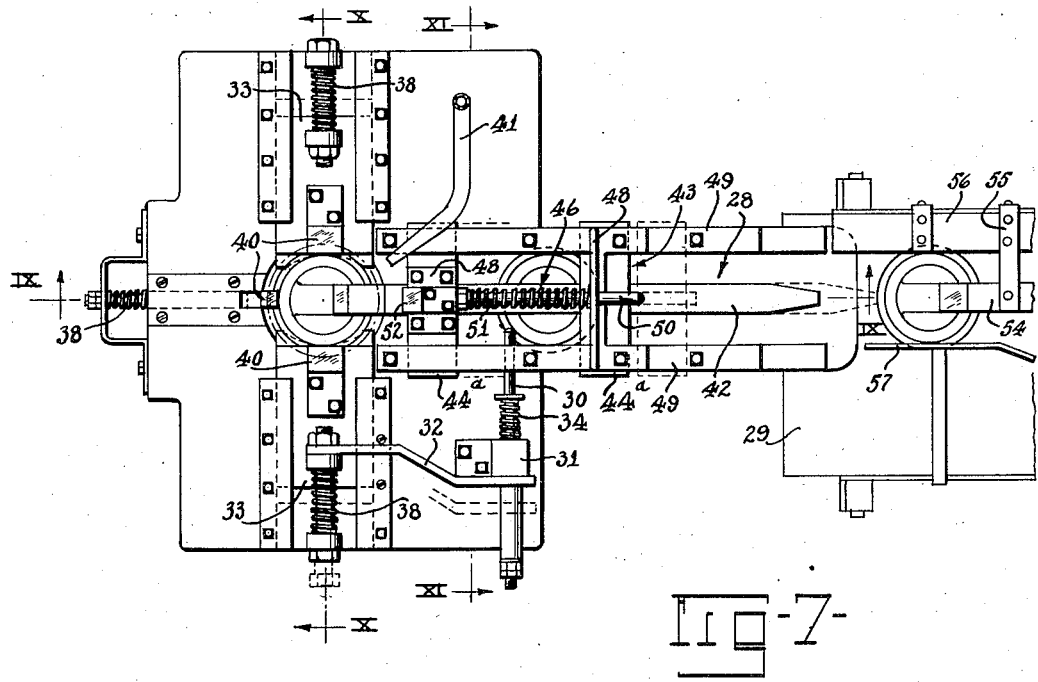
Fig. 7 is a fragmentary plan view showing the bottom member of one of the forming dies and the means for controlling the delivery and guidance of a blank to the die.
Figure 8:
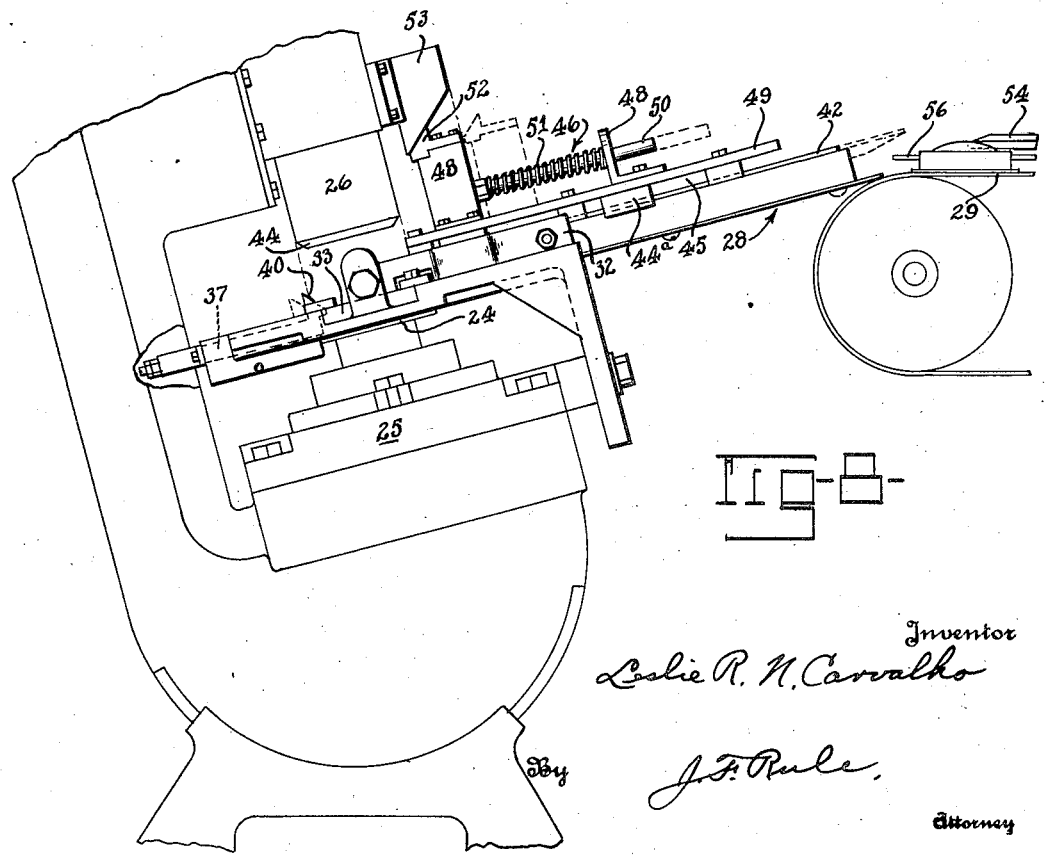
Fig. 8 is a fragmentary side elevational view.

The illustrated embodiment of the present invention includes a series of dies and semi-automatic means for conveying closure blanks and/or partially completed closures from one die to another.

In Fig. 1 I have shown dies for performing three successive operations upon the metal. These dies except for the specific shape of the formers and feeding and discharge means are shown and may well be of conventional form. At the right end of Fig. 1 a combined cutting and forming die 15 is shown. This die which is shown in some detail in Fig. 12 functions to cut a circular piece from a metal sheet and form it substantially as illustrated in Fig. 2 wherein the circular top 16 is provided with a transverse channel 17 and a depending attaching flange 18 is given its initial form. The die includes upper and lower members 19 and 20 respectively. The upper member is moved downwardly at regular time intervals for cooperation with the lower member in cutting and shaping the blank as just stated.

Forming dies 21 and 22 arranged to the left of the cutting and forming die 15 operate in succession on the blank to give it the shapes shown in Figs. 3 and 4 wherein it will be observed the side walls of the channel 17 and the top portion have been gradually drawn to the desired contour preparatory to the screw threading operation. Threading of the attaching flange may be effected by any conventional or preferred form of apparatus.

Each of the forming dies 21 and 22 consists of a stationary lower former 24 mounted upon a carrier 25 in an inclined position. An upper former 26 axially aligned with the lower former is mounted for movement toward and away from the latter. Such movement may be obtained by any suitable mechanism (not shown). A platform 27 surrounds the lower former 24.

Means for guiding and feeding the blanks or partially completed closures into the forming dies after they have reached a position in proximity thereto, consists of a structure substantially as follows. An inclined trough 28 is positioned with its discharge end in proximity to the lower die member and its upper or receiving end adjacent the delivery end of an endless conveyor 29 upon which the blanks are carried from one die to the feeder for the next succeeding die. This trough is of sufficient length to hold a number of blanks simultaneously, said blanks being allowed to move by gravity one at a time to a position upon the lower die member. Discharge of the blanks from the trough is controlled by a stop pin 30 which is mounted for reciprocation through one wall of the trough and normally projects into the path of movement of the blanks.

This stop pin 30 is slidingly mounted in a holder 31 at the outer end of an arm 32 which is carried by a slide 33. A coil spring 34 encircling the pin yieldingly holds it projected relative to the arm and functions as a safety device as is obvious.

The slide 33 is one of a pair arranged at opposite sides of the lower die member and carrying fingers 36 which take over the annular horizontal flange at the lower margin of the attaching flange of the blank. A third slide 37 arranged in alignment with the trough 28 and normally held projected by a spring 38 as are the other two slides, and carries a finger 39 cooperating with the other fingers 36 in holding the blanks or partially completed closures on the lower die member. Cams 40 at the inner end of the slides 33 and 37 are engaged by tapered surfaces 44 on the upper die member as the latter moves downward into operative position. This results in retraction of all of the fingers from engagement with the blank or partially completed closure as well as withdrawal of the stop pin 30 from the path of travel of the blanks through the trough 28. A blower 41 (Fig. 7) operates automatically upon upward movement of the upper die member to direct a blast of air against one margin of the blank for the purpose of removing it from the die.

In order that the blanks may be properly positioned in the dies, guide means substantially as follows is employed. A reciprocating guide bar 42 overlies the trough and functions to guide the blanks onto the lower die member. The lower end of said bar momentarily projects into the space between the die members and holds the blank in position upon said member. The guide bar is mounted upon a sliding frame 43 which may consist simply of a pair of cross bars 44ª having their ends disposed in slideways 45. The bar normally is held projected to its lowermost position by a spring device 46 which includes a pair of upstanding brackets 48, one on the front cross bar 44ª and the other spanning the trough and mounted upon the longitudinal bars 49 constituting the upper wall of the slideways 45. A rod 50 is anchored in the bracket on the front cross bar and slidingly projects through an opening in the other bracket. A coil spring 51 encircling the rod between said brackets yieldingly holds the guide bar in its forward position. A cam 52 at the upper end of the front bracket is disposed in the path of movement of a cam 53 on the upper die member. When the upper die member is moved downward the two cams are brought into engagement with each other and as a result the guide bar 42 is retracted. Thus the lower end of the bar is withdrawn from between the die members in advance of the forming operation.

Proper directing of the blanks to the trough 28 so that the guide bar thereover enters the groove in the top portion of the blank, is obtained by means of a stationary horizontal guide bar 54 disposed above the delivery end of each conveyor 29. This bar 54 which is aligned with the reciprocating guide bar is supported on arms 55 extending inwardly over the conveyor from a guide rail 56, the latter cooperating with a second rail 57 and the conveyor in bringing the blanks beneath the stationary guide bar 54.

In operation, lithographed metal sheets are fed through the "cutting and forming" die 15 (Fig. 1) which cuts the blanks therefrom and gives them the form shown in Fig. 2. The adjacent conveyor 29 carries the blanks to the feed device for the next or "forming" die. The horizontal guide bar 54 and guide rails 56 and 57 insure proper delivery of the blanks to the troughs 28. Frequently an attendant must shift the position of the blanks on the conveyors 29 in order that the channels or groove in the top portion will register with the guide bar. The blanks then enter the trough 28 and in timed relation with operation of the die are released one at a time for gravity delivery to the latter. As brought out heretofore the stop pin 30 is retracted with each operation of the corresponding die and releases a blank. After the blanks have been through the forming dies 21 and 22 the flanges are threaded. Thus the closure is completed.

Modifications may be resorted to within the spirit and scope of the appended claims.

What I claim is:

1. In combination, a forming die including a stationary lower die member, an upper die member mounted for recprocation toward and from the lower die member along an inclined axis, means for delivering partially completed articles one at a time to the die and placing them upon the lower member including an inclined trough; a guide bar extending lengthwise over the trough in position to guide articles during their travel along the trough and hold them until they are positioned over the lower die member, means actuated by movement of the upper die member for releasing the articles in the trough and allowing them to move one at a time to said position over said lower die member, and means for withdrawing said guide bar in the direction of its length and thereby releasing the article to the die.

2. In combination, a forming die including a stationary lower die member, an upper die member mounted for reciprocation toward and from the lower member along an inclined axis, means for delivering blanks one at a time to the die and placing them upon the lower member, said means including an inclined trough, a reciprocating guide bar extending lengthwise over the trough in position to guide articles during their travel along the trough, said guide bar having its lower end normally disposed above the lower die member in position to hold a blank on the latter, means for yieldingly holding the bar in its lowermost position, means actuated by movement of the upper die member for retracting said guide bar in the direction of its length and thereby releasing the blank to the die, and automatic means for releasing the blanks in the trough one at a time and allowing them to move to an operative position upon the lower die member.

3. In combination, a cutting and forming die adapted to form a blank with a channel therein, a forming die spaced therefrom, means for assisting in transferring a blank from the cutting and forming die to the forming die and placing it in the same relative position in the latter as that occupied in the first die, said means including an endless conveyor having inclined and horizontal portions, means for discharging a blank from the cutting and forming die to the inclined portion of the conveyor, a stationary guide bar disposed centrally over the horizontal portion of the conveyor to guide movement of the blanks to the discharge end of the conveyor in a predetermined position, a feed device arranged between the forming die and the horizontal portion of the conveyor, said device including an inclined stationary trough, a second guide bar extending along said trough and longitudinally aligned with and having one end disposed adjacent an end of said stationary guide bar, a stop device projecting into the path of the blanks at an intermediate position along said trough, means controlled and regulated by operation of the forming die for withdrawing said stop device and thereby releasing the blanks one at a time for movement to an operative position in said forming die, and means for periodically moving said second guide bar lengthwise away from the die for releasing the blanks to the die.

4. In combination, a forming die comprising a stationary lower die member, an upper die member mounted for reciprocation toward and from the lower die member along an inclined axis, said members having their meeting faces shaped to deform at least a portion of a transverse channel in a sheet metal blank delivered to said die, a stationary inclined trough disposed at right angles to said axis and adapted to guide blanks to the die, a guide bar arranged over and extending longitudinally of said trough in alignment with the channel deforming portions of the die members, said guide bar projecting into the channels of blanks moving down said trough, and means for periodically reciprocating the guide bar in the direction of its length and thereby withdrawing it from the blanks when the latter are delivered to the die.

5. In combination, a cutting and forming die, a forming die spaced therefrom, means for assisting in transferring a blank from the cutting and forming die to the forming die, said means including a traveling conveyor upon which the blank is discharged from the cutting die and a feeding device between the delivery end of the conveyor and the forming die consisting of an inclined trough, means for preventing rotation of the blank during said transfer and causing it to be placed in the same relative position rotatively in the forming die as that occupied in the first die, said preventing means including a stationary guide for the blank extending lengthwise over at least a part of the conveyor in position to engage and guide the blank, a reciprocating guide bar over said trough and extending lengthwise thereof in position to engage the blank and hold it against rotative movement during its travel along the inclined trough and until it reaches a position to be acted upon by the forming die, and automatic means actuated by the operation of the forming die for moving the reciprocating guide bar in the direction of its length away from the forming die and thereby releasing it from the blank.

LESLIE R. N. CARVALHO.